W. T. HOOFNAGLE.
METHOD OF AND APPARATUS FOR TREATING GASES AND VAPORS ELECTRICALLY.
APPLICATION FILED NOV. 23, 1917.
1,280,471.
Patented Oct. 1, 1918.
2 SHEETS—SHEET 1.
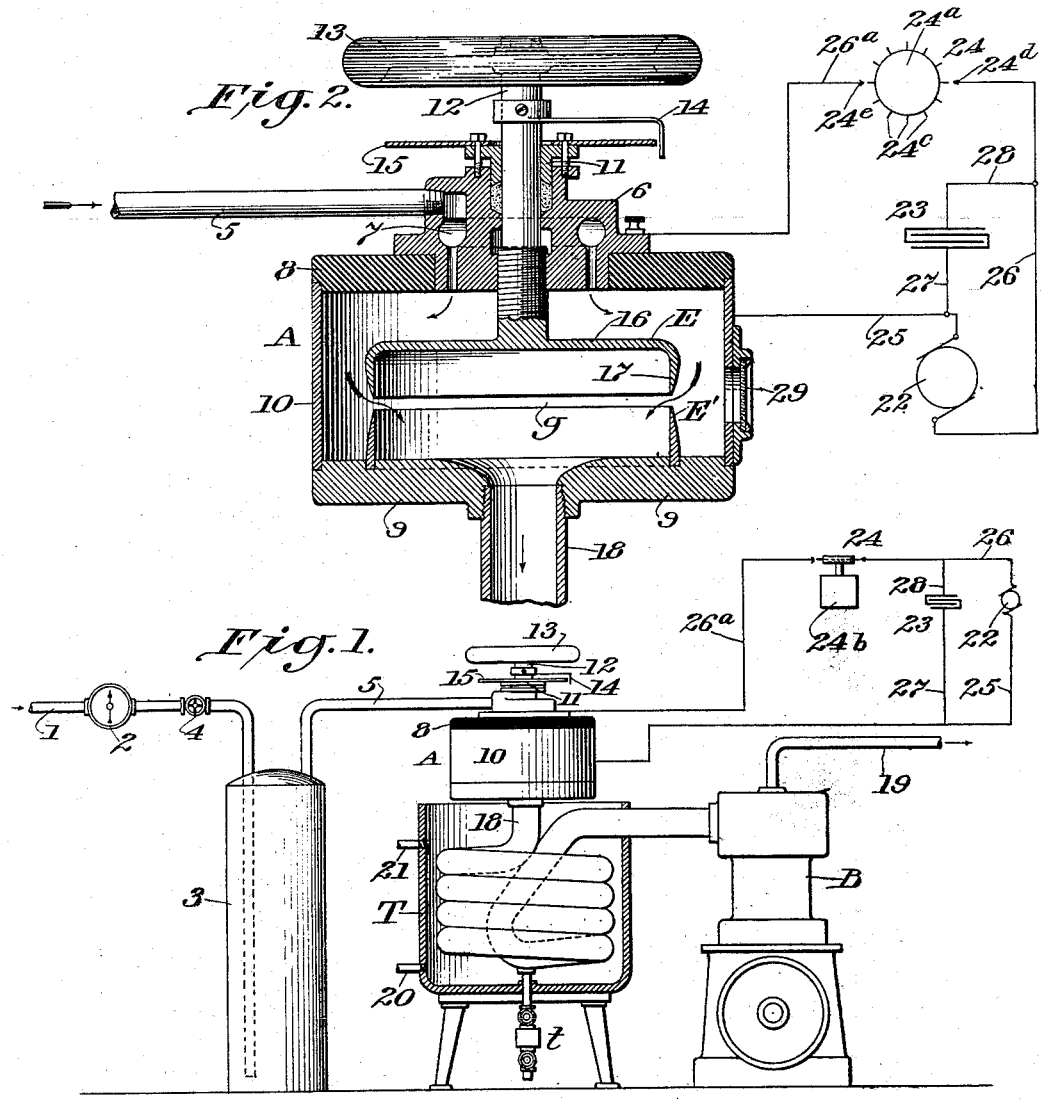

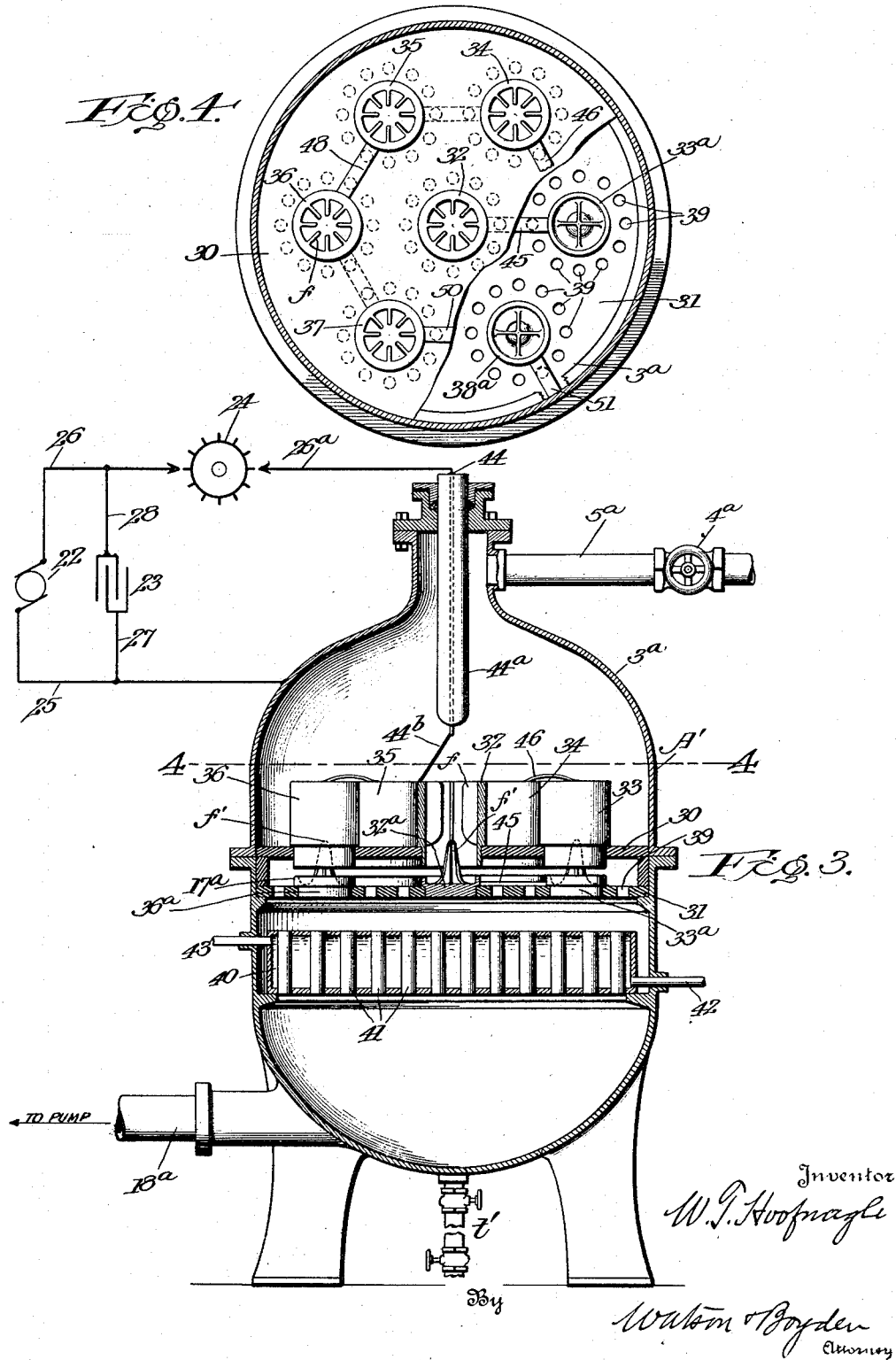

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

METHOD OF AND APPARATUS FOR TREATING GASES AND VAPORS ELECTRICALLY.

1,280,471.  Specification of Letters Patent.  Patented Oct. 1, 1918.

Application filed November 23, 1917. Serial No. 203,555.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Methods of and Apparatus for Treating Gases and Vapors Electrically, of which the following is a specification.

This invention relates to a method of and apparatus for treating gases and vapors electrically, and intended particularly for the treatment of air in the production of nitrogen oxids. The invention will be described as applied to this latter purpose. In carrying out the invention, I provide a closed re-action chamber containing opposed electrodes, and pass the air through said chamber, and between the electrodes, at a pressure substantially below atmospheric pressure. Between the electrodes, I maintain an electrical field characterized by extremely rapid, intermittent electrical discharges of short duration and great current density, and the air stream flowing through this field is subjected, in small volumes, to these heavy discharges, the rate of flow of the air being timed to the electrical discharges so that during the intervals between the discharges the treated volumes will pass on out of the field and will not re-treated.

In the accompanying drawing,

Figure 1 is a side elevation of an apparatus for carrying out my invention, the electrical circuits being shown diagrammatically;

Fig. 2 is a central, vertical section through the re-action chamber, the electrical connections also being shown;

Fig. 3 is a vertical section through a modified form of re-action chamber;

Fig. 4 is a section on the line 4—4 of Fig. 3, the support for the upper electrodes being partly broken away; and Fig. 5 is a diagram illustrating the electrical connections of the electrodes shown in Figs. 3 and 4.

Referring to Figs. 1 and 2 of the drawing, A indicates a closed re-action chamber through which the air or gases to be treated are drawn by means of an exhaust pump B. The air to be treated enters the apparatus through a pipe 1, in which may be placed a meter 2, for measuring the volume of air flowing through the system. The pipe 1 extends into a reservoir or expansion tank 3, and between said tank and the meter a hand operated valve 4 is arranged in the pipe 1 to restrict and regulate the flow of air, as desired. The pipe 1 extends downwardly nearly to the bottom of the tank 3, as shown in dotted lines, and from the top of the tank a pipe 5 leads to a fitting 6 on the re-action chamber A, said fitting having an annular slotted space 7 for permitting the air to flow from the pipe into the interior of the re-action chamber. The re-action chamber, as shown, is of cylindrical form, the upper end 8 of the cylinder being of suitable insulating material, and the lower end 9 and peripheral wall 10 being of metal. The fitting 6 is centrally located in the end or head 8 and is provided with a stuffing box 11, surrounding a shaft 12 which extends through the fitting into the re-action chamber and carries an annular electrode E. The shaft 12 has a threaded connection with the fitting 6, as shown, and by means of a hand wheel 13, made of insulating material and fitted to the shaft, the latter may be turned to raise and lower the electrode E. A pointer 14, secured to the shaft 12, is adapted to swing around the body of a graduated dial 15, and the adjustment of the electrode E may be noted by the readings on the dial. The electrode E, as shown, comprises a flat disk 16, having a downwardly turned flange 17, concentric with the axis of the shaft 12, the flange preferably tapering in a downward direction, as shown. Below the movable electrode E is arranged an annular electrode E', of the same diameter as the flange 17 and concentric with the axis of the shaft 12, this lower electrode projecting upward from the wall 9 and tapering in an upward direction, as shown. A pipe 18 is fitted into the lower wall 9 of the re-action chamber at the center thereof, and the air passing into the re-action chamber from the pipe 5 flows around the electrode E, and thence through an annular gap $g$, between the electrodes, and thence into the outlet pipe 18. This outlet pipe, as shown in Fig. 1, is coiled in a cooling tank T and has one end connected to the exhaust pump B. From the compression side of the pump, a pipe 19 carries the treated products to the oxidizers and absorbers, not shown. The cooling tank T has an inlet pipe 20, for the admission of cooling water, and an over-flow pipe 21 to permit the warm water to flow from the tank.

The course of air through the re-action chamber is indicated by the arrows in Fig. 2, and it will be noted that all of the air flowing into the chamber must pass through the annular gap $g$ between the electrodes. The treated products then pass through the cooling coil 18 and are then forced out through the pipe 19. A partial vacuum is maintained in the system by restricting the flow of air into the system at the valve 4. Because of the difference in pressure, the air flows rapidly past the valve 4 and it is desirable to quiet the air before entering the re-action chamber, and therefore the expansion tank 3 is arranged between the valve 4 and said chamber.

While the air is flowing through the apparatus, an electrical field is maintained across the annular gap $g$, and the air must all flow through this field in passing to the outlet pipe 18. This field is created by an apparatus designed to cause an intermittent flow of current of high periodicity and high density. This apparatus, as diagrammatically illustrated in the drawing, comprises a generator 22, which is preferably a high voltage, direct current dynamo, a condenser 23, and a spark gap device 24. One brush of the generator is connected by conductor 25 to the electrode E' through the side wall and bottom of the reaction chamber, and the other brush of the generator is connected by conductors 26 and $26^a$, through the spark gap device, to a binding post on the metal fitting 6 of the reaction chamber, and thence through the shaft 12 to the electrode E. The condenser, as shown, is connected at one side by conductor 27 to the wire 25, leading to one brush of the generator, and the opposite side is connected by conductor 28 to wire 26, leading to the opposite brush of the generator. The spark gap device 24 is of a well known type adapted to be driven by a motor and to make and break the circuit very rapidly. It is shown conventionally as a disk $24^a$, of metal, having a plurality of radial points at its periphery, which disk is rotated at high velocity by a motor $24^b$, the shaft of which is insulated from the disk. The radial points $24^c$ on the disk are thus revolved close to fixed points $24^d$ and $24^e$, connected to the conductors 26 and $26^a$, respectively, and as the diametrically opposite points on the disk pass the stationary points, the current leaps the gaps between the points and the current flows for an instant through the gap $g$, in the re-action chamber. As the points draw apart, the flow of current is interrupted. Each time the flow of current is cut off at the spark gap device, current accumulates in the condenser and this is discharged through the gap $g$ at the next establishment of flow by the spark gap device. Thus, there is a rapid interruption and establishment of the circuit from the generator through the gap $g$ in the reaction chamber, and because of the instantaneous discharges of accumulated energy in the condenser, the current density of the field in the gap $g$ is very great. Owing to the almost instantaneous interruption of the circuit after its establishment, at the spark gap device, the oscillations of the condenser are cut off or quenched, and therefore the field in the gap $g$ is created by a series of instantaneous discharges of high current density synchronous with the operation of the spark gap device, and between the successive discharges there is a very brief interval of time during which no current flows. For instance, if the spark gap device makes and breaks the circuit five thousand times per second, an intermittent current, discharging five thousand times per second, will flow across the spark gap $g$, and the intervals between the discharges will correspond in number but be greater in duration than the periods when the current is flowing. Thus, while the discharge will take place in the order of a millionth of a second, and the circuit is established at intervals of one five-thousandth of a second, the time intervals during which no current is flowing through the gap $g$ is in the order of two hundred times greater than the periods when the current is flowing. Any suitable rotary spark gap or quenched spark device may be employed for causing the intermittent field in the re-action chamber.

In treating the air, the exhaust pump B is maintained in contant operation and the valve 4 is partly closed so as to restrict the flow of air into the expansion chamber and cause a partial vacuum and rarefaction of the air. The air enters the expansion tank 3, and thence passing through the pipe 5, enters the re-action chamber and flows through the annular gap $g$ at right angles to the direction of current flow in the field between the electrodes, and thence passes into the cooling coil 18 and through the pump to the pipe 19, and thence to the oxidizers and absorbers. The rate of flow of air is regulated so that in passing through the gap $g$, the air will be treated to but one electrical discharge, the time interval between the discharges permitting the treated air to pass beyond the gap while untreated air is flowing into the field to be treated by the succeeding discharge, to avoid re-treatment of the air, as this lowers the efficiency of the apparatus. The rate of flow of the air may be regulated to some extent by the adjustment of the electrodes toward and from one another, thus shortening and lengthening the gap, and also by adjusting the valve 4 and the speed of the pump. The air, as previously stated, is treated under substantially less than atmospheric pressure and I have found with this, as with other apparatus, that the efficiency of the treatment is increased by this reduction in pressure. Also, in the present apparatus, the pressure has a marked effect upon the character of the electrical field. At atmospheric pressure, for instance, the discharges between the electrodes would be white, disruptive and irregular, and a uniform field would not be obtained. On the other hand, with a high vacuum in the apparatus, a violet field is produced, which is uniform but lacks density, the field tending to spread laterally between the electrodes. With such fields, the yield of nitrogen oxids is small. With the pressure and flow of air properly regulated, however, a dense reddish field, having the appearance of being finely striated in the direction of current flow, is produced, which I have found most efficient in the production of nitrogen oxids. In order to observe the character of the field, one or more windows 29 are placed in the side of the re-action chamber.

In this apparatus, the production of the oxids is not dependent upon heating the air to a high temperature, and this is shown by the fact that the apparatus remains at a comparatively low temperature, as do also the treated products. The air in passing through the gap is subjected to heavy electrical discharges of extremely short duration, delivered like hammer blows, and the treated air immediately passes from the field without re-treatment. It is advantageous to cool the treated products as soon as possible after treatment. This is accomplished by the cooling coil. In passing through the cooling coil, the gases contract in volume and hence the work of the pump in removing the gases is lessened in some degree by the cooling.

The efficiency of the apparatus as a whole may be increased by increasing the number of gaps in the re-action chamber and connecting these gaps in series, since there is a loss of energy at the rotary spark gap whether one or a series of gaps are employed in the re-action chamber, and this loss is proportionately less when a number of gaps is provided in the re-action chamber. In Figs. 3 and 4 of the drawing, I have shown a re-action chamber in which a plurality of pairs of electrodes are shown in series, within the re-action chamber, and the current for creating the field in these gaps passes through a single rotary spark gap device. Referring to these figures of the drawing, A' indicates the re-action chamber comprising a closed casing having an air inlet pipe $5^a$, at one end, and an outlet pipe $18^a$ at the opposite end, the latter pipe leading to the pump, not shown. In the pipe $5^a$ is arranged a valve $4^a$, for restricting the flow of air into the chamber. The upper part $3^a$ of the chamber is made large and serves the purpose of the expansion tank 3, in the previously described figures. In the central part of the re-action chamber are arranged two diaphragms 30 and 31, spaced apart from one another, these diaphragms being of insulating material. The diaphragm 30 has a plurality of openings into which are fitted a corresponding number of tubular electrodes numbered 32 to 38, and opposed to these upper electrodes are a corresponding number of lower electrodes, $32^a$ to $38^a$, inclusive. The upper electrodes are preferably provided with internal heat radiating fins $f$, and the lower electrodes are preferably formed with central, tapering projections $f'$, having longitudinal, heat-radiating fins which extend centrally into the upper electrodes. The lower electrodes comprise disk-shaped bodies having upwardly extending flanges $17^a$, which are opposed to the lower ends of the upper electrodes. The diaphragm 31 has a plurality of perforations 39 for permitting the treated air to flow downwardly into the lower part of the casing. Below the diaphragm 31 is arranged a tubular cooling device 40, through the tubes 41 of which the treated products pass on their way to the pump. This cooling device is provided with inlet and outlet pipes 42 and 43, respectively, through which cooling water can be passed. In the bottom of the casing A' is arranged a suitable trap $t'$, for collecting and drawing off any liquid that may accumulate within the casing.

The electrodes within the re-action chamber are connected so that the current will flow through the gaps in series. Thus, from the generator 22, the circuit leads through conductors 26, $26^a$, and rotary spark gap device 24, to a conducting rod 44, incased in insulating tube $44^a$, to a conductor $44^b$, leading to the central, upper electrode 32. Thence, as more clearly shown in the diagram, Fig. 5, the current flows across the central gap $g'$ to the lower, central electrode $32^a$, thence by conductor 45 to lower electrode $33^a$, thence across gap $g^2$ to upper electrode 33, thence by conductor 46 to upper electrode 34, thence across gap $g^3$ to lower electrode $34^a$, and so on successively through the gaps, $g^4$, $g^5$, $g^6$, and $g^7$, and thence by conductor 51 to the casing A'. The casing is connected by conductor 25 to the generator, and the condenser 23 is connected as in Fig. 1, between the conductors 25 and 26. It will be evident that when the apparatus is in operation, fields similar to those described in connection with Figs. 1 and 2 will be created between each pair of electrodes across the gaps $g'$, $g^2$, etc. The air entering from pipe $5^a$ passes through the upper electrodes and thence laterally out through the gaps. The treated air flows through the perforated diaphragm 31 downward through the cooling device and thence to the pump. As the air passes through the upper electrodes, in contact with the radiating fins, the air will be heated to some extent and the electrodes will be cooled. While the action of the apparatus is not dependent upon heat, yet the heating of the air is of advantage in increasing its conductivity. The projections $f'$ on the lower electrodes are also in the path of the incoming air and through these projections the lower electrodes are cooled.

Because of the high potential used in the generator, the casings of the re-action chambers are preferably connected to the ground, and because of the well known catalytic action of iron, the electrodes within the re-action chamber are preferably made of iron. All of the parts of the apparatus with which the treated gaseous products come in contact are made of acid-proof materials, or lined with such materials. An alternating current may be employed in connection with the spark gap device and condenser, to produce the field in the re-action chamber, but this is not found to be as satisfactory and efficient as the high potential, direct current used in conjunction with the condenser and spark gap device.

What I claim is:

1. The method of treating gases or vapors electrically which comprises maintaining a field, characterized by intermittent electrical discharges of short duration and high current density, between electrodes in a closed reaction chamber and passing the fluid to be treated through said field at a pressure substantially below atmospheric pressure.

2. The method of treating gases or vapors electrically which comprises maintaining a field, characterized by intermittent electrical discharges of short duration and high current density, between electrodes in a closed reaction chamber and passing the fluid to be treated through said field at a pressure substantially below atmospheric pressure and at a speed proportioned substantially to the periodicity of the discharges.

3. The combination with a closed re-action chamber of electrodes within said chamber, means for maintaining between said electrodes an electrical field characterized by intermittent electrical discharges of short duration and high current density, and means for passing the fluid to be treated through said field at a pressure substantially below atmospheric pressure.

4. The combination with a closed reaction chamber of electrodes within said chamber, means for maintaining between said electrodes an electrical field characterized by intermittent electrical discharges of short duration and high current density, and means for passing the fluid to be treated through said field at a pressure substantially below atmospheric pressure and at a speed proportioned substantially to the periodicity of the discharges.

5. The combination with a closed re-action chamber of concentric, annular electrodes within the chamber, means for maintaining between said electrodes an electrical field characterized by intermittent electrical discharges of short duration and high current density, and means for passing the fluid to be treated through said field at a pressure substantially below atmospheric pressure.

6. In an apparatus for treating gases and vapors electrically, the combination with a re-action chamber and means for passing the fluid to be treated therethrough, of a plurality of pairs of electrodes in said chamber, the several pairs being electrically connected in series, means for causing the fluid to flow in multiple through the gaps between the several pairs of electrodes, and a current source connected to said electrodes.

7. In an apparatus for treating gases and vapors electrically, the combination with a re-action chamber and means for passing the fluid to be treated therethrough, of a plurality of pair of electrodes in said chamber the several pairs being electrically connected in series, one electrode of each pair being tubular, a diaphragm extending across the chamber for causing the fluid to flow in multiple through said tubular electrodes and through the gaps between the several pairs, and a current source connected to said electrodes.

8. In an apparatus for treating gases and vapors electrically, a re-action chamber, a diaphragm or partition in said chamber, said diaphragm having openings therethrough, tubular electrodes fitting said openings, electrodes opposed to said tubular electrodes, said chamber having an inlet for the fluid at one side of the diaphragm and an outlet for the fluid at the other side of the diaphragm.

9. In an apparatus for treating gases and vapors electrically, a re-action chamber, a diaphragm or partition in said chamber, said diaphragm having openings therethrough, tubular electrodes fitting said openings and having heat radiating projections, electrodes opposed to said tubular electrodes, said chamber having an inlet for the fluid at one side of the diaphragm and an outlet for the fluid at the other side of the diaphragm.

10. In an apparatus for treating gases and vapors electrically, a re-action chamber, a diaphragm or partition in said chamber, said diaphragm having openings therethrough, tubular electrodes fitting said openings and having heat radiating projections, electrodes opposed to said tubular electrodes and having heat radiating projections extending into the latter, said chamber having an inlet for the fluid at one side of the diaphragm and an outlet for the fluid at the other side of the diaphragm.

11. The combination with a closed reaction chamber of electrodes within said chamber, means for maintaining between said electrodes an electrical field characterized by intermittent electrical discharges of short duration and high current density comprising a current source, a condenser connected across the terminals of said source, and a spark gap device arranged between the condenser and one of said electrodes, and means for passing the fluid to be treated through said field at a pressure substantially below atmospheric pressure.

In testimony whereof I have affixed my signature.

WILLIAM T. HOOFNAGLE.